(12) United States Patent
Mani et al.

(10) Patent No.: US 12,099,966 B2
(45) Date of Patent: Sep. 24, 2024

(54) DEVICE FOR HOLDING AND MONITORING WEIGHT OF PRODUCT(S) IN AN INVENTORY MANAGEMENT SYSTEM

(71) Applicant: DIGIT7 INDIA PRIVATE LIMITED, Richardson, TX (US)

(72) Inventors: Chithrai Selvakumar Mani, Richardson, TX (US); Nisarg Antony, Richardson, TX (US)

(73) Assignee: DIGIT7 INDIA PRIVATE LIMITED, Richardson, TX (US)

( * ) Notice: Subject to any disclaimer, the term of this patent is extended or adjusted under 35 U.S.C. 154(b) by 389 days.

(21) Appl. No.: 17/455,023

(22) Filed: Nov. 16, 2021

(65) Prior Publication Data
US 2023/0153750 A1 May 18, 2023

(51) Int. Cl.
*G01G 19/414* (2006.01)
*G01G 19/52* (2006.01)
*G06Q 10/087* (2023.01)

(52) U.S. Cl.
CPC ....... *G06Q 10/087* (2013.01); *G01G 19/4144* (2013.01); *G01G 19/52* (2013.01)

(58) Field of Classification Search
CPC .. G01G 19/4144; G01G 19/52; A47F 5/0006; A47F 7/00
See application file for complete search history.

(56) References Cited

U.S. PATENT DOCUMENTS

| | | | |
|---|---|---|---|
| 5,944,203 A | 8/1999 | Vlah et al. | |
| 10,732,026 B1 | 8/2020 | Danenberg et al. | |
| 11,002,589 B1 * | 5/2021 | Zhang | G01G 19/14 |
| 11,125,607 B1 * | 9/2021 | Justice | G01G 19/42 |
| 11,607,059 B2 * | 3/2023 | Fritsch | A47F 5/0018 |
| 2016/0135616 A1 * | 5/2016 | Fisher | A47F 5/0006 |
| | | | 211/13.1 |
| 2019/0049286 A1 * | 2/2019 | Kron | G01G 21/28 |
| 2021/0030169 A1 * | 2/2021 | Zhai | G01G 19/52 |

FOREIGN PATENT DOCUMENTS

CN 112515428 A * 3/2021 ............. A47B 57/48

OTHER PUBLICATIONS

USPTO (ISA); PCT/ISA/210; ISR; Jan. 27, 2023.
USPTO (ISA); PCT/ISA/220; Jan. 27, 2023.
USPTO (Isa); PCT/ISA/237; WO; Jan. 27, 2023.

* cited by examiner

*Primary Examiner* — Natalie Huls
(74) *Attorney, Agent, or Firm* — Steven H. Washam; Washam IP

(57) ABSTRACT

The disclosure herein relate to an inventory management system and more particularly, to a device for holding and monitoring weight of product(s) in the inventory management system of a store. The device (100) includes a main bracket (102), a load sensor (104), a load transfer member (106) and a holding member (108). The load sensor (104) is connected to the main bracket (102). The load transfer member (106) is connected to the load sensor (104). The holding member (108) is connected to the load transfer member (106). The device (100) is reliable and consumes less space.

8 Claims, 5 Drawing Sheets

DEVICE FOR HOLDING AND MONITORING WEIGHT OF PRODUCT(S) IN AN INVENTORY MANAGEMENT SYSTEM

TECHNICAL FIELD

The embodiments herein generally relate to an inventory management system and more particularly, to a device for holding and monitoring weight of product(s) in the inventory management system of a store.

BACKGROUND

Retailers, wholesalers and other product distributors typically maintain an inventory of various items that may be ordered, purchased, leased, borrowed, rented, viewed, and so forth, by clients or customers. For example, an e-commerce website may maintain inventory in a fulfillment center. When the customer orders an item, the item is picked from the inventory, routed to a packing station, packed, and shipped to the customer. In another instance, for an item to be moved from one location to another, it is picked from its current location and transitioned to a new location. In such cases, it is often desirable to monitor quantity of inventory within the facility. Likewise, physical stores maintain inventory in customer accessible areas, such as in a shopping area, and customers can pick items from inventory and take them to a cashier for purchase, rental, and so forth. In particular, inventory systems face challenges in making efficient use of time, space, resources in the face of growing demand and tighter shipping schedules. As a result, the ability to efficiently utilize available equipment and resources while maintaining efficiencies in terms of time and space can be crucial to the success of such inventory systems. Usually, the products are placed on a plate based weight sensor located on shelves. This arrangement consumes more space. Therefore, providing a compact accommodation for products in such inventory locations of the store is difficult and is one of the challenges posed to original equipment manufacturers (OEM's).

Therefore, there exists a need for a device for holding and monitoring weight of product(s) in an inventory management system of a store, which obviates the aforementioned drawbacks.

OBJECTS

The principal object of embodiments herein is to provide a device for holding and monitoring weight of product(s) in an inventory management system of a store.

Another object of embodiments herein is to provide a wall mounting type device for holding and monitoring weight of product(s).

Another object of embodiments herein is to provide the device for holding and monitoring weight of plurality of products, which is reliable and consumes less space.

These and other objects of embodiments herein will be better appreciated and understood when considered in conjunction with following description and accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments are illustrated in the accompanying drawings, throughout which like reference letters indicate corresponding parts in various figures. The embodiments herein will be better understood from the following description with reference to the drawings, in which.

DETAILED DESCRIPTION

Figure 1:
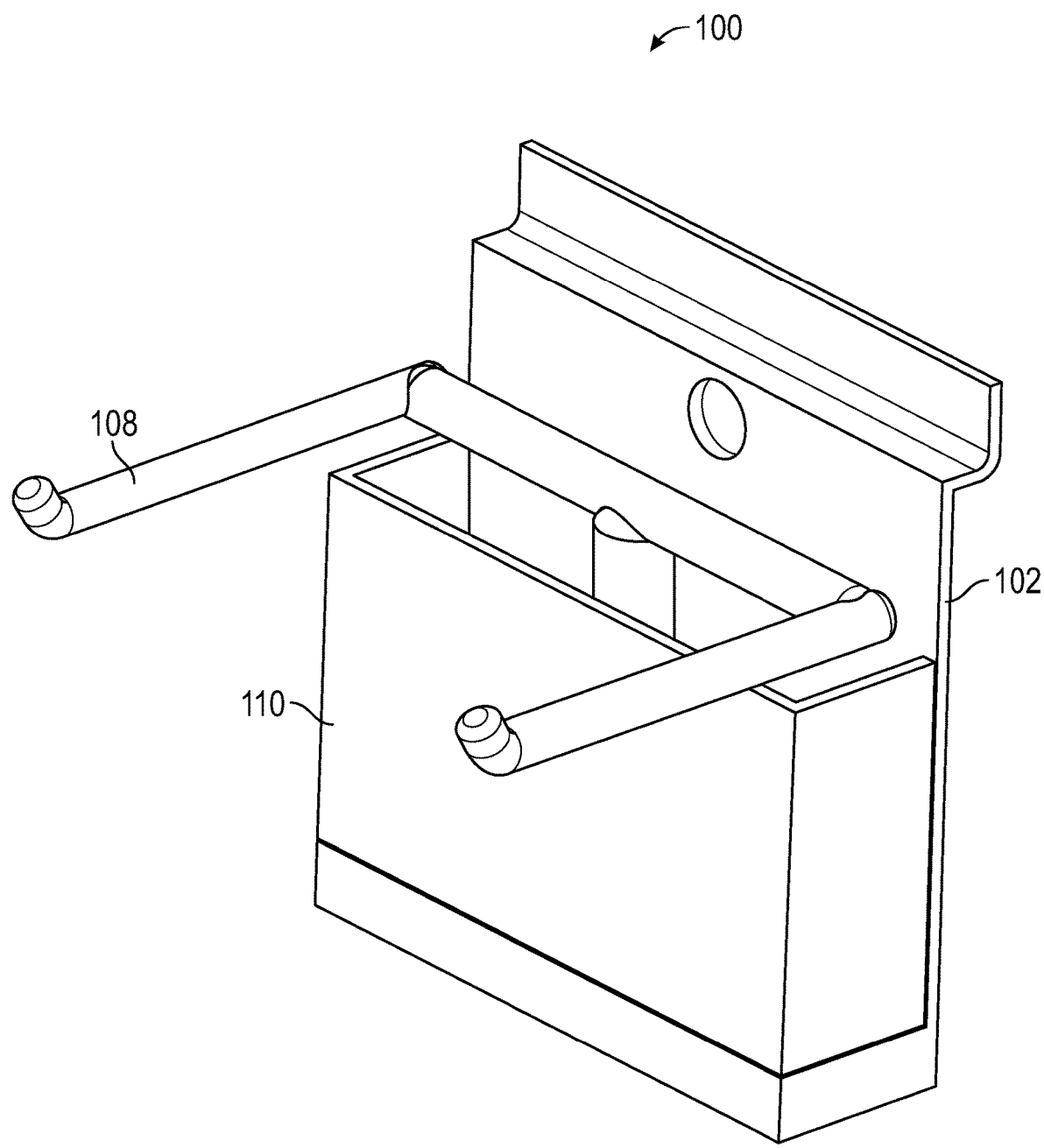
FIG. 1 depicts a perspective view of a device for holding and monitoring weight of product(s) in an inventory management system of a store, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a wall mounting type device for holding and monitoring weight of product(s) in an inventory management system of a store, which is reliable and consumes less space. Referring now to the drawings FIGS. 1 through 5, where similar reference characters denote corresponding features consistently throughout the figures, there are shown embodiments.

Figure 2:
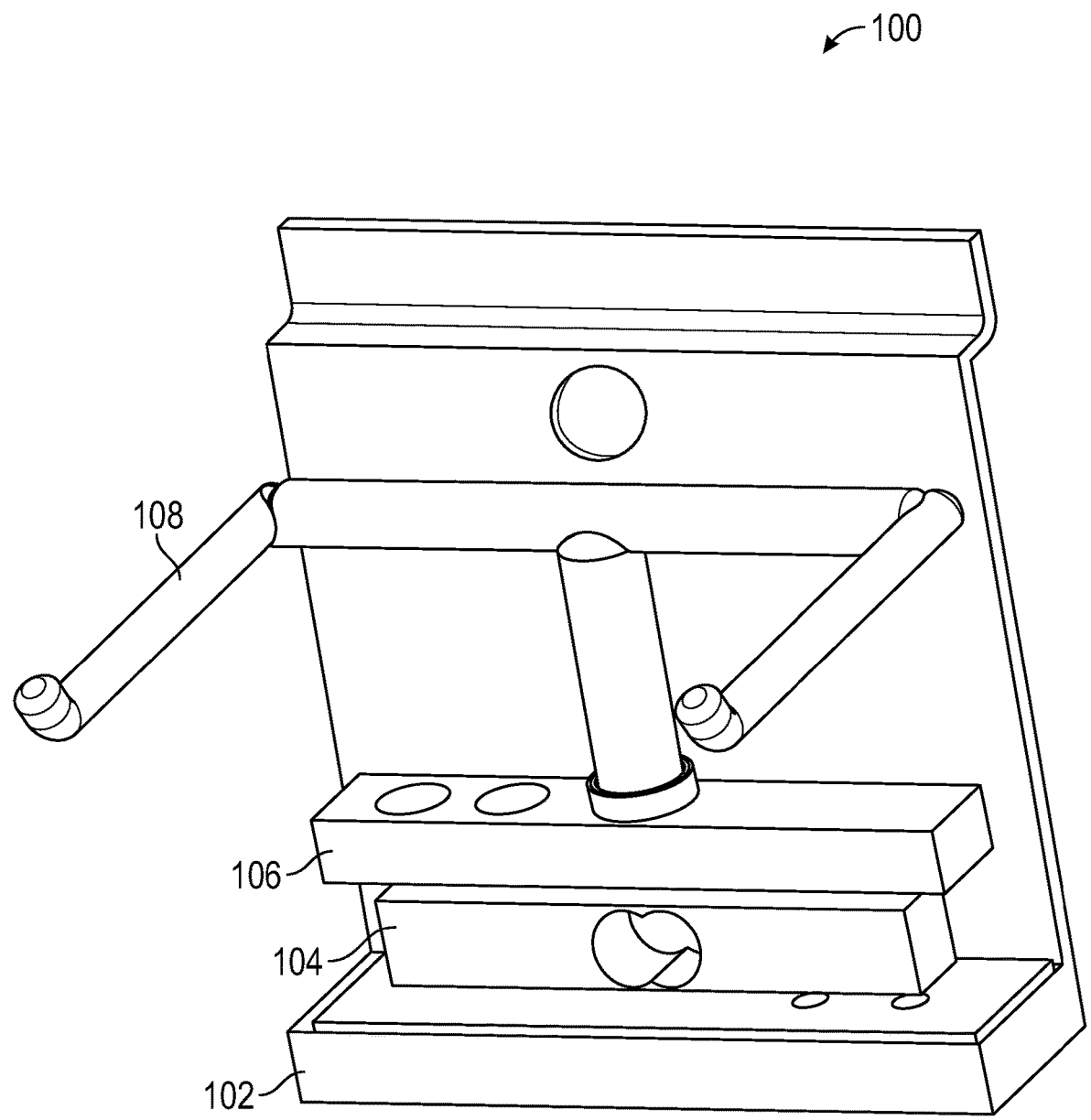
FIG. 2 depicts another perspective view of the device without cover, according to embodiments as disclosed herein.

FIG. 1 depicts a perspective view of a device (100) for holding and monitoring product(s) in inventory management of a store, according to embodiments as disclosed herein. FIG. 2 depicts another perspective view of the device (100) without cover (110), according to embodiments as disclosed herein. In an embodiment, the device (100) includes a main bracket (102), a load sensor (104), a load transfer member (106) and a holding member (108). For the purpose of this description and ease of understanding, the device (100) is explained herein with below reference to holding and monitoring weight of product(s) in an inventory management of a store, where the product which is hanged onto the device (100) is not limited to candies. However, it is also within the scope of the invention to at least one of add at least one component to the device (100) and remove at least one component from the device (100) for holding and monitoring any other product(s) by using code readers (scanner), presence detecting sensors, cameras and any other identification devices, where inventory management is required, without otherwise deterring the intended function of the device (100) as can be deduced from the description and corresponding drawings.

The inventory management system may be configured to maintain information about products (items), users, condition of the facility, and so forth. For example, the inventory management system may maintain data indicative of a number of products at a particular inventory location, what products a particular user is ordered to pick, how many products have been picked or placed at the inventory location, requests for assistance, environmental status of the facility, and so forth.

Figure 3:
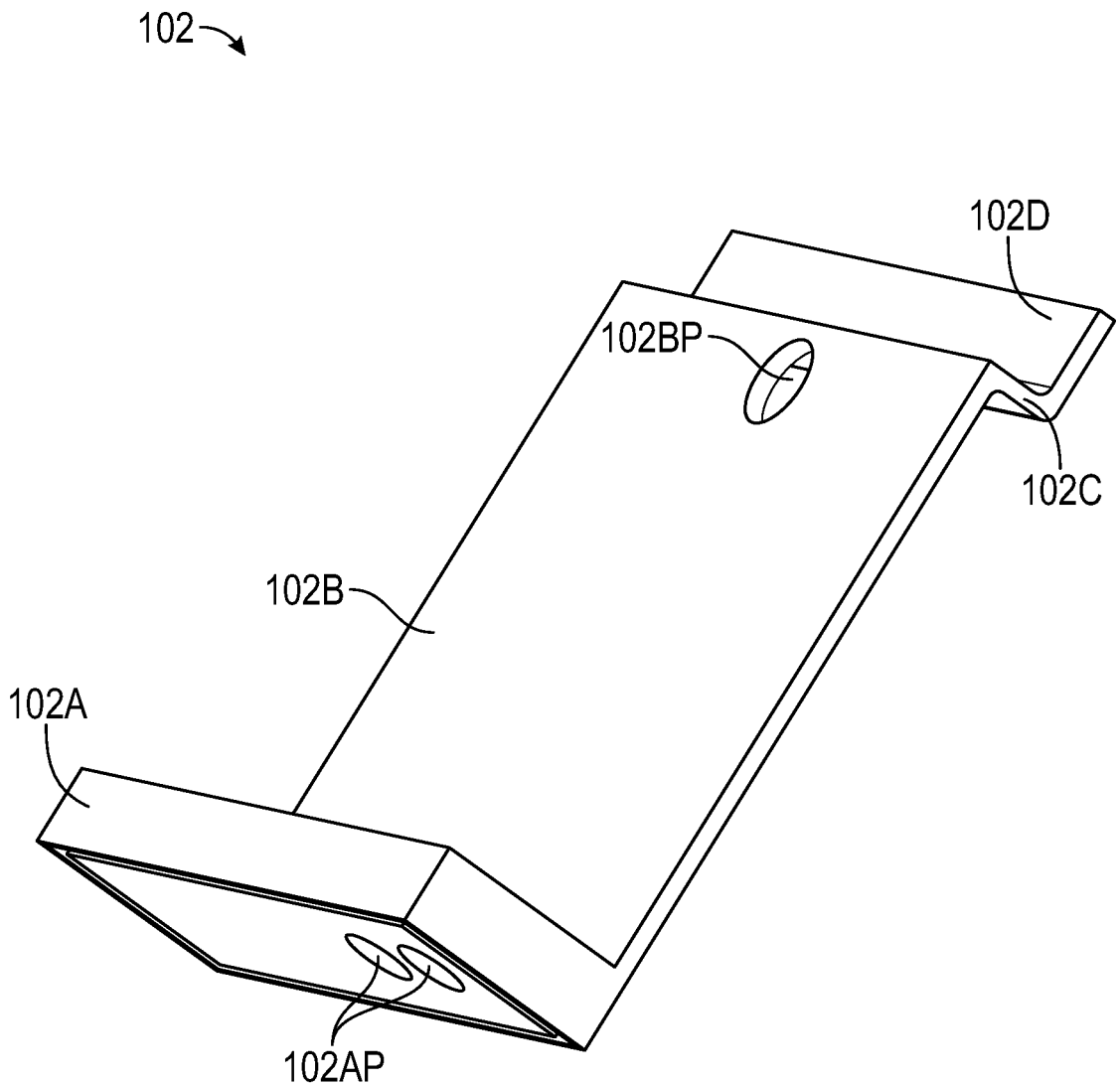
FIG. 3 depicts a perspective view of a main bracket of the device, according to embodiments as disclosed herein.

FIG. 3 depicts a perspective view of a main bracket (102) of the device (100), according to embodiments as disclosed herein. The main bracket (102) is adapted to support the holding member (108) through the load transfer member (106) and the load sensor (104). The main bracket (102) includes a horizontal base (102A) and a vertical wall (102B). The vertical wall (102B) of the main bracket (102) transversely extends from corresponding side edge portion of the base (102A) is an upward direction. The main bracket (102) is secured to one of a wall and a shelf. The vertical wall (102B) defines an opening (102BP) adapted to adapted to facilitate routing of wires if required. The horizontal base (102A) of the main bracket (102) defines a plurality of fastener receiving portions (102AP) adapted to receive fastener ((bolt) (not shown)) therethrough to secure the load sensor (104) onto the horizontal base (102A) of the main bracket (102). Further, the main bracket (102) includes a horizontal portion (102C) and a vertical portion (102D). The horizontal portion (102C) of the main bracket (102) transversely extends from a top end of the vertical wall (102B), where the horizontal portion (102C) is resting on a panel attached to a wall of any one of a storage device or partition or room. The vertical portion (102D) of the main bracket (102) transversely extends from the horizontal portion (102C) in an upward direction, where the vertical portion (102D) is engaged with the wall and adjacent panel attached to the wall by inserting the vertical portion (102D) of the main bracket (102) into the opening defined by the adjacent panel.

The load sensor (104) is connected to the main bracket (102) by using fasteners such as bolt and nuts. The load sensor (104) is parallel and spaced away with respect to the load transfer member (106). The load sensor (104) is connected to the horizontal base (102A) of the main bracket (102). The load sensor (104) is parallel and spaced away from the horizontal base (102A) of the main bracket (102). Fasteners (nuts) are positioned between the load sensor (104) and the horizontal base (102A) of the main bracket (102) thereby spacing the load sensor (104) away from the horizontal base (102A) of the main bracket (102). The load sensor (104) is adapted to monitor and communicate load of the product(s) to an electronic controller unit (ECU). The load sensor (104) defines a bar shape. The maximum weight threshold of the load sensor (104) is at least 20 kilograms. It is also within the scope of the invention to vary the maximum weight threshold of the load sensor (104) as per requirement. Weight data from the load sensor (104) of the device (100) is used to determine a change in weight. Based on the weight data and product data indicative of what products are hanged on the device (100) in particular inventory location, activity such as a pick or place of the product and the inventory location in which the activity occurred may be determined. For example, the weight data may be used to determine data such as a quantity of products that have been picked from or placed to an inventory location, to determine the identity of product that has been picked from or placed to the inventory location, and so forth.

Figure 4:
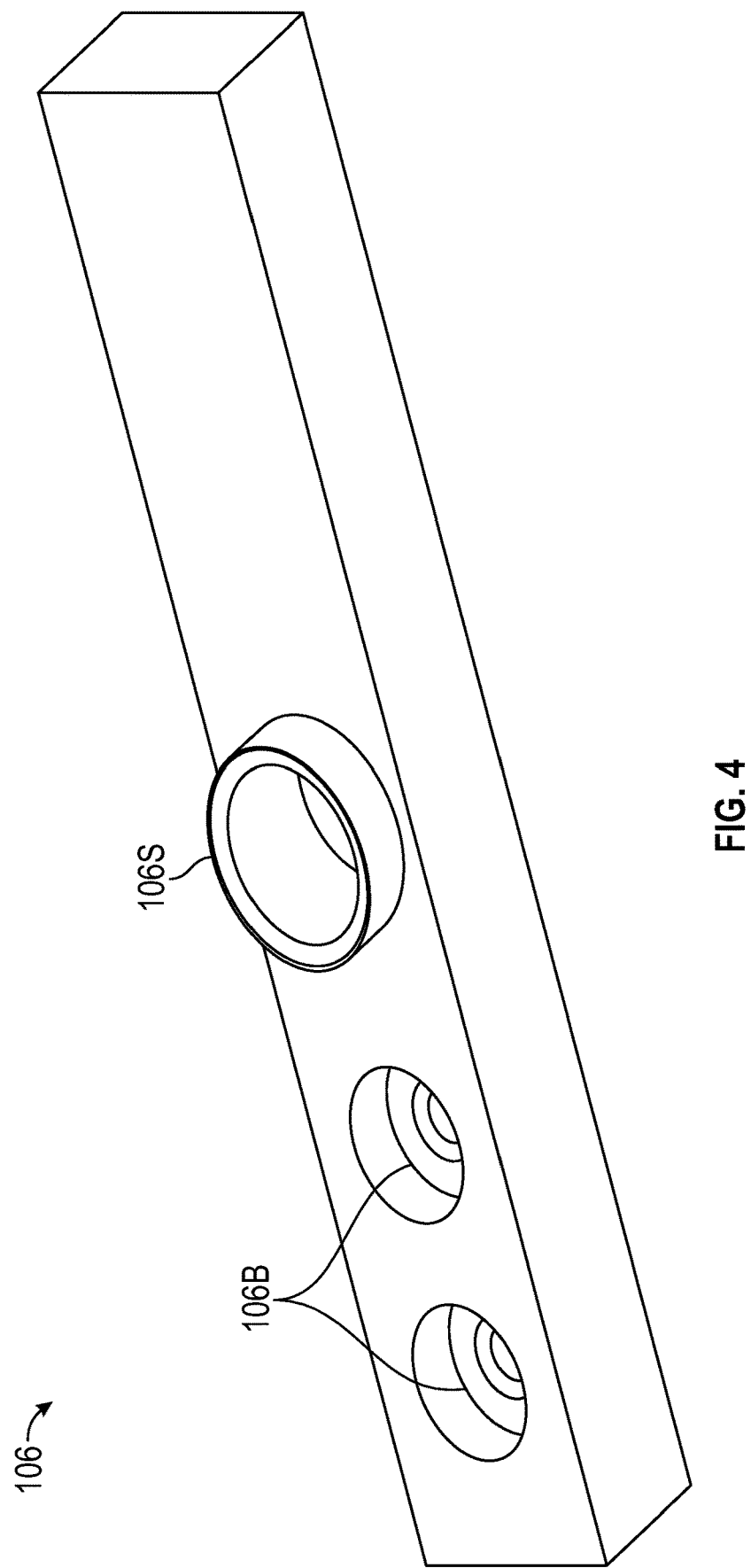
FIG. 4 depicts a perspective view of a load transfer member of the device, according to embodiments as disclosed herein.

FIG. 4 depicts a perspective view of a load transfer member (106) of the device (100), according to embodiments as disclosed herein. The load transfer member (106) is connected to the load sensor (104) by using fasteners such as bolt and nuts. The load transfer member (106) is disposed above the load sensor (104). The load transfer member (106) is adapted to transfer a load of the product(s) to the load sensor (104). The load transfer member (106) defines a central tube (106S) and a plurality of fastener receiving portions (106B). The central tube (106S) of the load transfer member (106) is adapted to receive a bottom end of the stem (108A) of the holding member (108) thereby mounting the holding member (108) onto the load transfer member (106). Each fastener receiving portion (106B) is adapted to receive the fastener ((bolt) (not shown)) therethrough to secure the load transfer member (106) onto the load sensor (104) through nuts. Each fastener receiving portion (106B) of the load transfer member (106) is considered to be a counter bore. The load transfer member (106) defines a bar shape. Fasteners (nuts) are positioned between the load transfer member (106) and the load sensor (104) thereby spacing the load transfer member (106) away from the load sensor (104).

Figure 5:
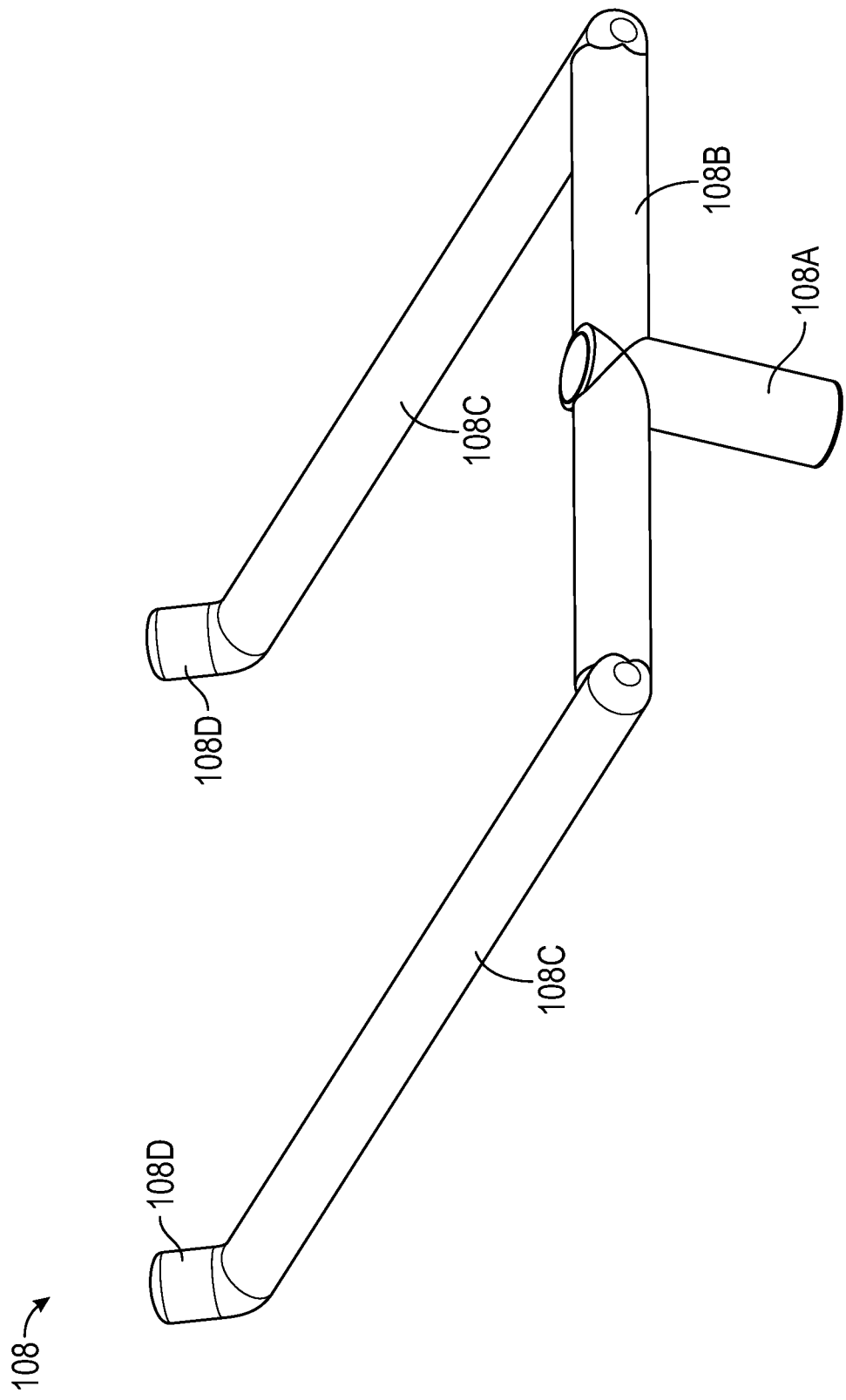
FIG. 5 depicts a perspective view of a holding member of the device, according to embodiments as disclosed herein.

FIG. 5 depicts a perspective view of a holding member (108) of the device (100), according to embodiments as disclosed herein. The holding member (108) is connected to the load transfer member (106). The holding member (108) is adapted to hold the product(s) in which the product(s) is hanged onto the holding member (108). The holding member (108) includes a stem (108A), a horizontal branch (108B) and a plurality of arms (108C). The stem (108A) of the holding member (108) is adapted to be connected to the load transfer member (106). The horizontal branch (108B) of the holding member (108) is located at a top end of the stem (108A) and extends on both sides of the stem (108A). Each arm (108C) extends from corresponding end of the horizontal branch (108B) of the holding member (108). Each arm (108C) of the holding member (108) is adapted to hold the product(s). An end of each arm (108C) defines an angular portion (108D) adapted to restrict releasing of product(s) from the holding member (108).

The cover (110) is adapted to be connected to the main bracket (102) for covering the load transfer member (106) and the load sensor (104). The cover (110) defines a U shape.

The technical advantages of the device (100) for holding and monitoring weight of product(s) in the inventory management system are as follows. The device (100) is reliable and consumes less space. The device (100) can hold plurality of products thereon.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modifications within the spirit and scope of the embodiments as described herein.

We claim:

1. A device (100) for holding and monitoring weight of product(s) in an inventory management system, said device (100) comprising:

a main bracket (102);

a load sensor (104) connected to said main bracket (102);

a load transfer member (106) connected to said load sensor (104); and a holding member (108) connected to said load transfer member (106), the holding member (108) including: a stem (108A); a horizontal branch (108B) located at a top end of the stem and extending on both sides of the stem; and a plurality of arms (108C), each arm extending from a corresponding end of the horizontal branch (108B), each arm (108C) adapted to hold one or more products;

the load transfer member (106) including a central tube (106S) adapted to receive the stem (108A) of the holding member (108) thereby mounting the holding member to the load transfer member; and a plurality of fastener receiving portions (106B) adapted to receive a fastener therethrough to secure the load transfer member (106) to the load sensor (104).

2. The device (100) as claimed in claim 1, wherein said load sensor (104) is parallel and spaced away with respect to said load transfer member (106); and said load transfer member (106) is disposed above said load sensor (104).

3. The device (100) as claimed in claim 1, wherein said main bracket (102) is adapted to support said holding member (108) through said load transfer member (106) and said load sensor (104); said holding member (108) is adapted to hold said product(s) in which said product(s) is hanged onto said holding member (108); said load transfer member (106) is adapted to transfer a load of said product(s) to said load sensor (104); and said load sensor (104) is adapted to monitor and communicate load of said product(s) to an electronic controller unit (ECU).

4. The device (100) as claimed in claim 1, wherein an end of each of said arm (108C) defines an angular portion (108D) adapted to restrict releasing of said product(s) from said holding member (108).

5. The device (100) as claimed in claim 1, wherein said device (100) includes a cover (110) adapted to be connected to said main bracket (102) for covering said load transfer member (106) and said load sensor (104), where said cover (110) defines a U shape.

6. The device (100) as claimed in claim 1, wherein said main bracket (102) includes:

a horizontal base (102A); and a vertical wall (102B) transversely extending from a corresponding side edge portion of said base (102A) in an upward direction, wherein said load sensor (104) is connected to said horizontal base (102A) of said main bracket (102) through fastener receiving portions (102AP) receiving one or more fasteners; and said load sensor (104) is parallel and spaced away from said horizontal base (102A) of said main bracket (102).

7. The device (100) as claimed in claim 6, wherein said load sensor (104) defines a bar shape; said load transfer member (106) defines a bar shape; said main bracket (102) is secured to one of a wall and a shelf; said vertical wall (102B) defining an opening (102BP) adapted to facilitate routing of wires; and said horizontal base (102A) of said main bracket (102) defining a plurality of fastener receiving portions (102AP) adapted to receive one or more fasteners therethrough to secure said load sensor (104) onto said horizontal base (102A) of said main bracket (102).

8. The device (100) as claimed in claim 6, wherein said main bracket (102) includes, a horizontal portion (102C) transversely extending from a top end of said vertical wall (102B), where said horizontal portion (102C) is adapted to rest on a panel that is attached to a wall of any one of a storage device, a partition, and a room; and a vertical portion (102D) transversely extending from said horizontal portion (102C) in an upward direction, where said vertical portion (102D) is engaged with the wall and adjacent panel attached to the wall by inserting the vertical portion (102D) of the main bracket (102) into the opening defined by the adjacent panel.

\* \* \* \* \*